United States Patent Office 3,185,343
Patented May 25, 1965

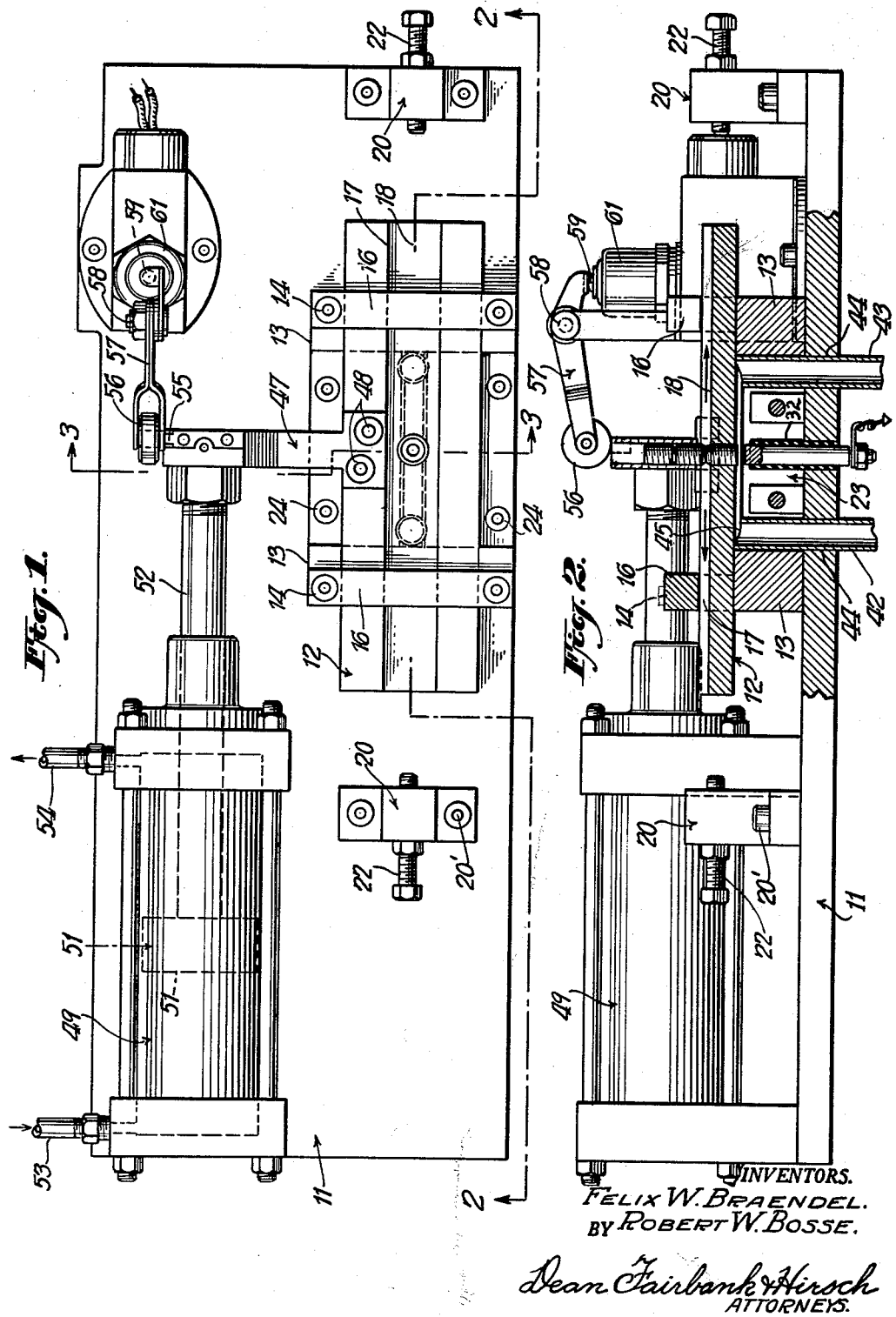
INVENTORS.
FELIX W. BRAENDEL.
BY ROBERT W. BOSSE.
Dean Fairbank & Hirsch
ATTORNEYS.

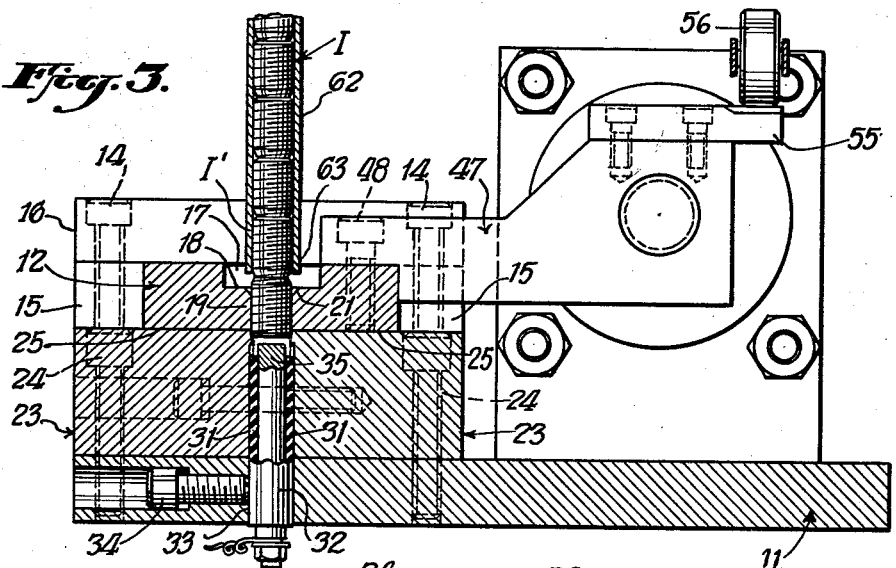

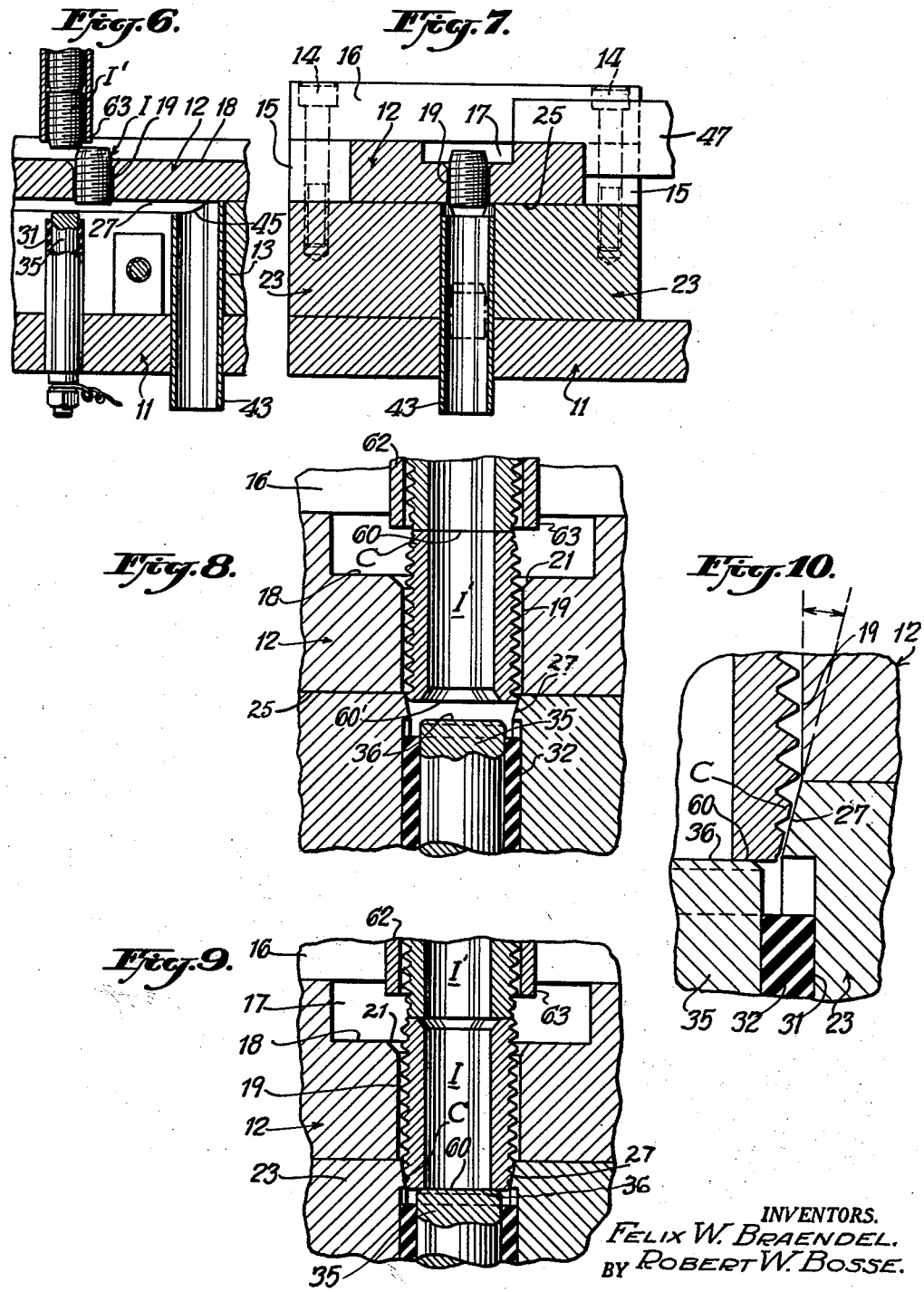

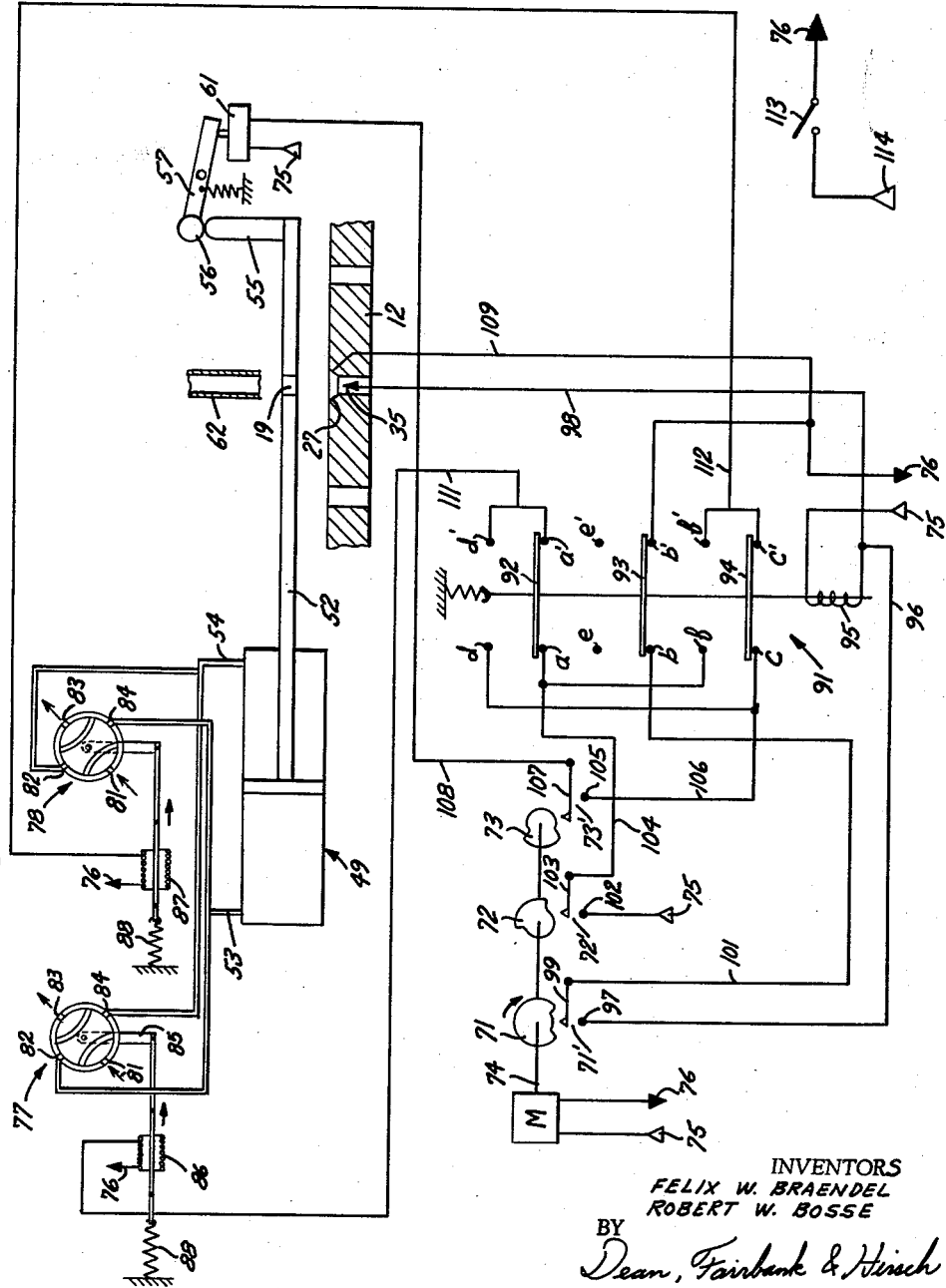

3,185,343
INSERT ORIENTING EQUIPMENT
Felix W. Braendel, Teaneck, and Robert W. Bosse, Englewood Cliffs, N.J., assignors to Groov-Pin Corporation, Ridgefield, N.J., a corporation of New York
Filed Oct. 9, 1961, Ser. No. 143,949
8 Claims. (Cl. 221—13)

This invention relates to equipment for properly orienting partially completed inserts for presentation to drilling equipment of the type shown and described in Patent No. 2,913,933, to form holes in the insert that effect a self-tapping action when the insert is used.

As conducive to an understanding of the invention, it is noted that inserts of the above type are formed with a chamfered outer periphery at one end to act as a pilot or lead end to be introduced into a bore in the material into which the insert is to be installed, and the holes to be formed by such drilling equipment are in the chamfered portion of such insert.

Where the inserts must be visually inspected by the operator and oriented so that each has its chamfered portion in the same relative position for feeding to the drilling equipment, since the chamfered portion is relatively inconspicuous, such operation is slow and time-consuming. In addition to the time involved for this operation, the likelihood of human error is great, especially after the operator has handled a large number of inserts, due to the resultant fatigue.

It is accordingly among the objects of the invention to provide an equipment that has but few parts and is not likely to become deranged even after long use, and which will automatically and dependably, and with no need for supervision, and at a relatively high rate of speed, properly orient inserts with the chamfered portion thereof in the same relative position with respect to the length of the insert so that the subsequent drilling operation may be properly performed.

According to the invention, these objects are accomplished by the arrangement and combination of elements hereinafter described and more particularly recited in the claims.

This application is a continuation-in-part of co-pending application Serial No. 67,264, filed November 4, 1960, now abandoned.

In the accompanying drawings in which is shown one of various possible embodiments of the several features of the invention, FIG. 1 is a top plan view of the equipment, FIG. 2 is a view taken along line 2—2 of FIG. 1, FIG. 3 is a transverse view taken along line 3—3 of FIG. 1, FIG. 4 is a top plan view of the guide blocks, FIG. 5 is a perspective view of the guide blocks, FIGS. 6 and 7 are sectional views illustrating the movement of the insert by the transfer plate, FIGS. 8 and 9 are detail sectional views on an enlarged scale illustrating the action of the insert to control the sensing action of the equipment, FIG. 10 is a detail view on an enlarged scale of the insert and the guide track, and FIG. 11 is a diagrammatic view of a control circuit for the equipment.

Referring now to the drawings, the equipment desirably comprises a base plate 11 on which a transfer plate 12 is slidably mounted. Although the transfer plate 12 may be mounted in any suitable manner, as shown in FIG. 2, the mount desirably comprises a pair of spaced parallel end blocks 13 secured by screws 14 to the base plate 11.

Positioned on each of the end blocks 13 at each end thereof is a spaced block 15, and a retainer bar 16 extends the length of each end block 13, resting on the associated pair of spacer blocks 15, the retainer bars 16 and the associated spacer blocks 15 also being secured by the screws 14.

The transversely aligned pairs of spacer blocks 15, as shown in FIG. 3, define a guide for the transfer plate 12 which, as shown in FIGS. 1 to 3, is an elongated rectangular bar having a central groove 17 rectangular in cross section, extending the length thereof. The floor 18 of groove 17, midway between the ends of the latter, has a cylindrical vertical bore 19 which desirably has a beveled mouth 21 to receive an insert I.

Means are provided to limit the movement of the transfer plate 12. To this end, as shown in FIGS. 1 and 2, a pair of blocks 20 is provided longitudinally aligned with the transfer plate 12 and stradling the latter. Each of the blocks 20 is secured to the base plate 11 as by screws 20', and each has an adjustment screw 22 against which the associated end of the transfer plate may abut when it is reciprocated in the manner hereinafter described.

Positioned between the end blocks 13 and extending at right angles thereto is a pair of complementary guide blocks 23 which are secured to the base plate 11 as by screws 24, the top surfaces 25 of the guide blocks being directly beneath the transfer plate 12 which slides on such surfaces 25.

As shown in FIGS. 4 and 5, the inner parallel surfaces 26 of the guide blocks 23 are spaced from each other and the upper edges 27 of such inner surfaces 26 are beveled to define an elongated track.

Each of the guide blocks 23 midway between its ends has a vertical arcuate groove 31 in its inner surface 26, the upper end of each groove below the associated beveled edge 27. The grooves 31 define a vertical cavity to receive a cylindrical sleeve 32 of insulating material, the lower end of which is positioned in a vertical bore 33 in base plate 11, the sleeve being retained in place by set screw 34. Positioned in sleeve 32 is a contact core 35 of conducting material, the upper end 36 of which extends between and is substantially aligned with the lower ends of the beveled edges 27. Since the diameter of core 35 is less than the spacing between the beveled edges 27, the core 35 and the edges 27 are electrically insulated from each other.

Each of the guide blocks 23 also has a vertical arcuate groove 41 at each end extending the entire height of the block, opposed pairs of grooves 41 receiving the upper end of cylindrical discharge tubes 42 and 43. The tubes are equidistantly spaced on each side of the core 35 and are positioned in corresponding vertical bores 44 in base plate 11. Desirably, the upper end 45 of each tube aligned with the track defined by the beveled edges 27 is cut away for the purpose hereinafter set forth.

The bore 19 in the transfer plate 12, the core 35 and the discharge tubes 42, 43 are so positioned that when the transfer plate is in its central position, the bore 19 will be vertically aligned with the core 35, and when the transfer plate is in either of its extreme positions, the bore 19 will be aligned with one or the other of the discharge tubes 42, 43.

Means are provided to reciprocate the transfer plate from its central position to either of its two extreme positions.

To this end, as shown in FIGS. 1 and 3, an actuating arm 47 is secured as by screws 48 to the transfer plate 12, preferably midway between its ends, and extends laterally outward therefrom. An actuator 49 is secured to the base plate 11 and extends parallel to the transfer plate 12. The actuator may be of the pneumatically-operated type and has a piston 51 slidably mounted therein to which a piston rod 52 is secured, the free end of the piston rod being secured to the end of arm 47.

Through suitable valve means, gas under pressure may be applied to the ports 53, 54 of the actuator 49 to effect movement of the piston rod 52 thereof, and through the arm 47, corresponding movement of transfer plate 12, the abutments on the base plate aligned with the ends of the transfer plate 12 limiting the movement of the latter.

The arm 47 desirably carries an actuating finger 55 at its outer end designed to engage a roller 56 mounted at one end of a trip lever 57 pivoted between its ends as at 58. The other end of the lever 57 is designed to engage the plunger 59 of a micro-switch 61.

Means are provided to feed inserts I one at a time into the bore 19 in the transfer plate 12. Each of the inserts I has a chamfered portion C at one end and is of smaller diameter at the extremity 60 of such end than at the extremity 60′ of the other end of the insert.

To feed the inserts I into bore 19 a cylindrical feed tube 62 is provided having its outlet end 63 vertically aligned with core 35 and positioned above the floor 18 of groove 17.

The tube 62 is so mounted that when one insert I is in the bore 19, which is of height such that the upper end of the insert will extend slightly above the floor 18 of the transfer plate 12, the next successive insert I′ will extend but slightly beyond the end of the tube.

Although the equipment above described may be controlled in any suitable manner, a typical control circuit is illustratively shown in FIG. 11.

The control circuit comprises a plurality of timing cams 71, 72, 73 mounted on a common shaft 74 driven by a motor M, one terminal of the motor being connected to one side 75 of a source of electric current and the other to a terminal 76.

The cams 71, 72, 73 control three normally open switches 71′, 72′, 73′ and are designed to close said switches in predetermined manner.

The air actuator 49 is controlled by valves 77, 78 which are identical. Each valve has a casing with four ports 81, 82, 83, 84 and a rotatable member designed in one position to close all of the ports and in a second position to connect ports 81, 84 and 82, 83.

The ports 81 of both valves are connected to a source of air under pressure and the ports 83 are connected to atmosphere. The ports 82 and 84 of valve 77 are connected to ports 53, 54 of air actuator 49 and the ports 82 and 84 of valve 78 are connected to ports 54 and 53 of the air actuator.

The rotatable member of each of the valves 77, 78 has a control lever 85 connected by suitable links to the movable core of an electric solenoid 86, 87 respectively, each of said cores being normally urged by an associated spring 88 to neutral position to close the ports of the associated valves 77, 78.

The control circuit has a main relay 91 which has three contact arms 92, 93, 94 ganged to move in unison and controlled by the coil 95 of the relay.

When the relay coil is energized, the contact arms 92, 93, 94 engage fixed contacts $a$–$a'$, $b$–$b'$ and $c$–$c'$ respectively and are spaced from fixed contacts $d$–$d'$, $e$–$e'$, $f$–$f'$ respectively.

One end of coil 95 of relay 91 is connected by lead 96 to fixed contact 97 of switch 71′ and by lead 98 to core 35. The other end of coil 95 is connected to the side 75 of the source of current.

Movable contact arm 99 of switch 71′ is connected by lead 101 to fixed contact $b$ of relay 91. Fixed contact 102 of switch 72′ is connected to side 75 of the source of current and movable contact arm 103 of switch 72′ is connected by lead 104 to fixed contacts $a$ and $f$ of relay 91.

Fixed contact 105 of switch 73′ is connected by lead 106 to fixed contacts $c$ and $d$ of relay 91 and movable contact arm 107 of switch 73′ is connected by lead 108 to one side of micro-switch 61, the other side of the micro-switch being connected to the side 75 of the source of current.

The micro-switch is normally open when finger 55 engages roller 56 and is closed to complete a circuit at all other times.

The edges 27 which are of conducting material as is the core 35, are connected by lead 109 to terminal 76 and also to contact $b'$ of relay 91.

The contacts $a'$ and $d'$ of relay 91 are connected together and by lead 111 to one side of the coil of electric solenoid 86, the other side of which is connected to terminal 76.

The contacts $c'$ and $f'$ of relay 91 are connected together and by lead 112 to one side of the coil of electric solenoid 87, the other side of which is connected to terminal 76.

The terminals 76 are all connected to one side of main switch 113, the other side of which is connected to the other side 114 of the source of electric current.

*Operation*

The tube 62 is connected to a suitable feeding device of any conventional type, which will continuously discharge the inserts I into the tube 62. However, such inserts are positioned at random in the tube 62, i.e., the chamfered portion C may be at the upper or lower end thereof.

Assuming that the cams 71, 72, 73 are in the position shown, the main switch 113 is closed. With the transfer plate 12 at its central position, in which the bore 19 therein is axially aligned with core 35, the lowermost insert I in the tube will fall into the bore 19, as shown in FIG. 3.

Assuming that chamfered portion C of the insert is in the downward position, as shown in FIG. 9, the associated end 60 of the insert, by reason of the complementary bevel of edges 27, will move downwardly sufficiently to engage the upper end 36 of core 35.

As a result, the metal insert I will complete a circuit between the core 35 and the beveled edges 27 and the coil 95 of relay 91 will be energized so that contact arms 92, 93, 94 engage contacts $a$–$a'$, $b$–$b'$, $c$–$c'$ as shown in FIG. 11.

Rotation of the cam 71 will close switch 71′ to complete a holding circuit for the coil 95 of relay 91 through contacts $b$–$b'$ of the energized relay.

While cam 71 still maintains such holding circuit, cam 72 will rotate to close switch 72′. As a result, a circuit will be completed through contacts $a$–$a'$ to solenoid 86 to energize the latter and actuate valve 77 to connect ports 81, 84 and 82, 83. As a result, gas under pressure will be applied to port 54 of actuator 49 to effect movement of the piston rod 52 to the left from the position shown in FIGS. 1 and 2. This will cause corresponding movement of transfer plate 12, which will move the insert I to the left, the lower end of the insert riding along the beveled edges 27 which define the track.

When the left end of the transfer plate 12 strikes the stop screw 22, the lower end of the insert carried in bore 19 in plate 12 will have passed through the cut-away portion 45 at the upper end of tube 42 and the insert will be longitudinally aligned with the tube 42 so that it will drop therein by gravity, with the chamfered portion at the lower end of the insert so that it may be fed to drilling equipment of the type shown in said Patent No. 2,913,933.

After a predetermined time delay, cam 72 will permit switch 72' to open to de-energize solenoid 86 so that spring 88 will return the core of solenoid 86 to its initial position and also close all the ports of valve 77; the transfer plate 12 remaining on the left side of its neutral position. After a further slight delay, cam 73 will close switch 73' which is in series with micro-switch 61 which is now closed. As a result a circuit will be completed through contacts c–c' to electric solenoid 87 to energize the latter and actuate valve 78 to connect ports 81, 84 and 82, 83. This will cause gas under pressure to be applied to port 53 of actuator 49 to move the piston rod 52 to the right, such movement effecting corresponding movement of the transfer plate 12. When the transfer plate is at its central position with the bore 19 aligned with core 35, the finger 55 will engage the roller 56 to pivot lever 57 to actuate micro-switch 61 to open the latter to break the circuit to solenoid 87 so that spring 88 thereof will restore the core of solenoid 87 to its initial position and also close all of the ports of valve 78, the transfer plate thus remaining in neutral position.

At this time cam 73 will permit switch 73' to open and cam 71 will permit switch 71' to open breaking the holding circuit for relay 91 and readying the equipment for the next cycle, the contact arms 92, 93, 94 now engaging contacts d–d', e–e' and f–f'.

When the transfer plate 12 initially moved to the left, effecting corresponding movement of the insert I in bore 19, the insert I' immediately above (FIG. 9) would drop from the end 63 of tube 62, the lower end of said insert I' riding on the floor 18 of groove 17. When the transfer plate 12 is returned to its central or neutral position, since the bore 19 in the transfer plate 12 would be vertically aligned with insert I', the latter would drop into said bore. Assuming that the chamfered end of the insert I' was at the upper end of the latter, as shown in FIG. 8, the lower end 60' of the insert would abut against the beveled edges 27.

As previously set forth, by reason of the chamfer at one end 60 of the insert, its diameter would be less than the diameter of the other end 60'. Hence, such other end 60' would not drop downwardly between the beveled edges 27 as far as the chamfered end 60, so that there would be no contact with core 35. This is clearly shown in FIG. 8. As a result, relay 91 would not be energized.

When cam 72 rotated to close switch 72', a circuit would be completed through contacts f–f' to solenoid 87. As a result, valve 78 would be actuated to apply gas under pressure to port 53 to effect movement of the transfer plate to the right. In the same manner as previously described, the bore 19 in the transfer plate would move into alignment with tube 43; the lower end of the insert riding along beveled edges 27, passing through the cut-away portion 45 of tube 43 to drop down the latter by gravity.

Thereupon, cam 72 will release switch 72' to break the circuit to solenoid 87, the valve 78 closing the ports thereof with the transfer plate remaining in the right hand position. Cam 73 will then close switch 73' and as micro-switch 61 is closed, a circuit will be completed through contacts d–d' to solenoid 86 to actuate valve 77 to connect its ports 81, 84 and 82, 83. As a result, gas under pressure will be applied to port 54 to effect movement of the transfer plate 12 to the left to its central or neutral position, engagement of the roller 56 by arm 55 actuating the micro-switch 61 to break the circuit to solenoid 86 to close the ports of valve 77. Thus, the transfer plate 12 will be retained at its neutral or central position ready for the next sorting cycle.

The equipment above described will permit feeding of inserts of the above type from an unassorted batch to a drilling equipment without need for any manual orienting operation, with attendant saving in the cost of fabrication of the finished products.

As many changes could be made in the above equipment, and many apparently widely different embodiments of this invention could be made without departing from the scope of the claims, it is intended that all matter contained in the above description or shown in the accompanying drawings shall be interpreted as illustrative and not in a limiting sense.

Having thus described our invention, what we claim as new and desire to secure by Letters Patent of the United States is:

1. Equipment for sorting hollow inserts of the type having a chamfered periphery at one end, depending upon the vertical orientation of such insert, said equipment comprising a reciprocable transfer member having an aperture freely to receive such insert, a contact member, guide means positioned between said transfer member and said contact member and determining the vertical location of said insert and against which the side periphery of the insert at one end thereof abuts when it is positioned in said aperture, to permit engagement of such insert with said contact member only when the insert is oriented with such chamfered periphery at its lower end, said guide means comprising a groove having opposed spaced beveled surfaces, the distance between the upper edges of the beveled surfaces being greater than the distance between the lower edges of the beveled surfaces, said side periphery of the insert abutting against such beveled surfaces, a discharge member to receive such inserts, said discharge member being laterally spaced from said contact member, means controlled by such engagement with said contact member to effect movement of said transfer member in direction to move said aperture and the insert therein laterally into alignment with said discharge member to be discharged thereinto from said aperture, whereby the inserts in said discharge member will be oriented with their chamfered peripheries at the same relative end, a second discharge member, and means when said insert is oriented in said aperture, with its chamfered portion at its upper end, to effect lateral movement of the transfer member in the opposite direction to move said aperture and the insert therein into alignment with the second discharge member to be discharged thereinto from said aperture.

2. The combination set forth in claim 1 in which said transfer member is a slidably mounted plate and each of said discharge members is a tube having its mouth in the path of movement of said aperture.

3. The combination set forth in claim 1 in which said discharge members are longitudinally aligned with said contact member, the latter being centrally located between said discharge members.

4. The combination set forth in claim 1 in which said discharge members are longitudinally aligned with said contact member, the latter being centrally located between said discharge members, and means are provided normally to retain said transfer member in its central position with said aperture vertically aligned with said contact member.

5. The combination set forth in claim 1 in which means are provided after said transfer member has moved in either direction to align its aperture with either discharge member to return said transfer member to its central position, with said aperture vertically aligned with said contact member.

6. The combination set forth in claim 1 in which said transfer member is a slidably mounted plate and a reciprocable actuator operatively connected to said transfer member effects movement of the latter.

7. The combination set forth in claim 1 in which means are provided successfully to feed inserts into the aperture in said transfer member.

8. The combination set forth in claim 1 in which a feed tube is vertically aligned with said contact member and positioned above the latter, said transfer member is positioned between the outlet end of said feed tube and said contact member, said aperture in said transfer member being movable into vertical alignment with said tube, said outlet end being positioned so that when one insert is in said aperture, the insert in said tube immediately thereabove will protrude slightly beyond the mouth of the latter, whereby when said transfer member is moved the insert in the tube will ride on the top surface of the transfer member.

References Cited by the Examiner
UNITED STATES PATENTS

| | | | |
|---|---|---|---|
| 620,350 | 2/99 | McGrail | 221—171 X |
| 1,347,851 | 7/20 | Haefele. | |
| 2,420,299 | 5/47 | Campbell | 221—264 X |
| 2,649,178 | 8/53 | Payne. | |
| 2,742,134 | 4/56 | Boon | 221—171 X |
| 2,845,164 | 7/58 | Stahl | 221—173 X |
| 3,015,413 | 1/62 | Hengel | 221—9 |

RAPHAEL M. LUPO, *Primary Examiner.*

KENNETH N. LEIMER, LOUIS J. DEMBO, *Examiners.*